Patented Nov. 18, 1941

2,263,436

UNITED STATES PATENT OFFICE 2,263,436

DEHYDRATION OF UNSATURATED ALIPHATIC CYANIDES

Edgar C. Britton and Arthur R. Sexton, Midland, Mich., assignors to The Dow Chemical Company, Midland, Mich., a corporation of Michigan No Drawing. Application May 23, 1940, Serial No. 336,720

5 Claims. (Cl. 202—42)

This invention concerns a method of removing water from aqueous unsaturated lower aliphatic cyanides, i. e. unsaturated aliphatic cyanides containing two or three carbon atoms exclusive of the cyanide radical, and in particular relates to the dehydration of aqueous vinyl cyanide.

Among the various known methods for the preparation of vinyl and methyl-vinyl cyanides, those involving the removal of a molecule of water from the corresponding alkylene cyanohydrin, i. e. ethylene or propylene cyanohydrins, whereby the cyanide product is obtained in admixture with water, enjoy widest use and are best suited for operation on a commercial scale. The separation of the cyanide product from the aqueous mixture initially obtained when employing such method, however, presents a problem of considerable difficulty since the unsaturated lower aliphatic cyanides and water are to a certain extent mutually soluble and form low-boiling azeotropes. Furthermore, such cyanides readily polymerize at relatively low temperatures and great care must be exercised to prevent an appreciable proportion of the product being converted to polymer during its separation from the aqueous mixture.

We have now found that mixtures of the unsaturated lower aliphatic cyanides and water may readily be separated by distilling the water therefrom in the form of its azeotropic mixture with methylene chloride. Methylene chloride ($CH_2Cl_2$) is a colorless, nonflammable liquid which boils at approximately 41°–42° C. It is miscible with vinyl and methyl-vinyl cyanides but does not form azeotropic mixtures therewith, and is soluble in water to an extent of less than 2 per cent by weight at 20° C. With water, it forms a low-boiling azeotropic mixture which distills at approximately 38° C. and contains about 5.5 per cent by weight of water. Accordingly, methylene chloride is well suited for use in removing water from aqueous vinyl or methylvinyl cyanides since its distillation temperature, as well as that of its azeotropic mixture with water, is so low that there is little tendency for the cyanide to polymerize during the distillation treatment.

The removal of water from aqueous vinyl cyanide according to the invention is preferably carried out in a distillation apparatus of the usual type, comprising a still heated by any convenient means, an efficient fractionating column, condenser, and receiver. A mixture of the aqueous vinyl cyanide and methylene chloride is passed into the still and heated, whereby the vapors of the azeotropic mixture of methylene chloride and water distilling at approximately 38° C. pass upthrough the fractionating column and into the condenser. The condensate is collected in the receiver where it separates into two layers. The lower layer, comprising methylene chloride saturated with water and a small proportion of vinyl cyanide, is drawn off in a continuous manner and is returned to the still where it may again serve to remove water. The upper layer, comprising water saturated with methylene chloride and a small proportion of vinyl cyanide, is also drawn off continuously and is usually discarded, although if desired the vinyl cyanide and methylene chloride contained therein may be recovered by fractional distillation. Regardless of the treatment of the upper layer of the condensate, however, the distillation is continued until the condensate no longer separates into two layers, i. e. until all the water has been distilled over and removed as the upper condensate layer. The product remaining in the still consists of a substantially anhydrous mixture of methylene chloride and vinyl cyanide which is readily separated simply by distilling off the methylene chloride, leaving the vinyl cyanide substantially anhydrous. By operating in this manner, the methylene chloride is recycled without serious loss and practically all of the vinyl cyanide is recovered in substantially anhydrous form. The same mode of operation is, of course, applicable to the dehydration of aqueous methyl-vinyl cyanides.

The proportion of methylene chloride employed may be varied widely, it only being necessary that liquid methylene chloride be present within the still during the entire operation. If desired, the process may be carried out in one pass without returning the methylene chloride to the still, in which case there should be employed at least 19 parts by weight of methylene chloride per part of water to be removed since the azeotropic mixture of methylene chloride and water contains 19 parts by weight of methylene chloride per part of water.

When the dehydration process herein described is carried out in metal apparatus in the absence of oxygen and peroxides, substantially no polymerization of the cyanide takes place during the distillation. When carried out in glass apparatus or in the presence of oxygen or peroxides, however, some polymerization may occur as a result of the catalytic influence of light or of the oxygen or peroxides. In such case, it is advantageous to add a small quantity of a polymerization inhibitor, such as hydroquinone, to the aqueous cyanide before the dehydration treatment and/or to carry out the treatment in an atmosphere of an inert gas.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. In a process for the removal of water from an aqueous cyanide selected from the class consisting of vinyl cyanide and the methyl-vinyl cyanides, the steps which comprise mixing methylene chloride therewith and distilling water and methylene chloride from the mixture until the cyanide is substantially anhydrous.

2. In a process for the removal of water from aqueous vinyl cyanide, the steps which comprise mixing methylene chloride therewith and distilling water and methylene chloride from the mixture until the cyanide is substantially anhydrous.

3. In a process for the removal of water from an aqueous cyanide selected from the class consisting of vinyl cyanide and the methyl-vinyl cyanides, the steps which comprise heating the aqueous cyanide in the presence of a quantity of liquid methylene chloride sufficient to effect azeotropic distillation of methylene chloride and water, permitting the distillate to settle into separate layers, and returning the lower layer to the mixture undergoing distillation.

4. In a process for the removal of water from aqueous vinyl cyanide, the steps which comprise heating the aqueous vinyl cyanide in the presence of a quantity of liquid methylene chloride sufficient to effect azeotropic distillation of methylene chloride and water, permitting the distillate to settle into separate layers, and returning the lower layer to the mixture undergoing distillation.

5. In a process for the removal of water from aqueous vinyl cyanide, the steps which comprise heating the aqueous vinyl cyanide in the presence of a quantity of liquid methylene chloride sufficient to effect azeotropic distillation of methylene chloride and water, permitting the distillate to settle into separate layers, returning the lower layer of the distillate to the mixture undergoing distillation, continuing the distillation until substantially all of the water has been removed from the vinyl cyanide, and thereafter distilling methylene chloride from the dehydrated vinyl cyanide.

EDGAR C. BRITTON.
ARTHUR R. SEXTON